United States Patent [19]

Bradley

[11] Patent Number: 5,136,572
[45] Date of Patent: Aug. 4, 1992

[54] OPTICAL DATA STORAGE USING TEMPERATURE STABILIZER LASERS

[75] Inventor: Eric M. Bradley, San Diego, Calif.

[73] Assignee: Tacan Corporation, Carlsbad, Calif.

[21] Appl. No.: 579,932

[22] Filed: Sep. 10, 1990

[51] Int. Cl.$^5$ ............................................. G11B 7/125
[52] U.S. Cl. .................................. 369/108; 369/109; 369/116; 369/121; 369/122
[58] Field of Search ............... 369/122, 121, 109, 108, 369/110, 116, 107, 32; 365/119, 108, 127, 215, 234, 235; 372/33, 20

[56] References Cited

U.S. PATENT DOCUMENTS

| | | | |
|---|---|---|---|
| 4,675,974 | 6/1987 | Pohker et al. | 372/33 |
| 4,783,776 | 11/1988 | Ishigaki et al. | 369/121 |
| 4,878,224 | 10/1989 | Kuder et al. | 372/20 |
| 4,908,813 | 3/1990 | Ojima et al. | 369/109 |

OTHER PUBLICATIONS

*Reading and Writing of Photochemical Holes Using GaAlAs-Diode Lasers*, P. Pokrowsky, et al., Optics Letters, vol. 8, No. 5, May 1983, pp. 280-282.

*Videodisc and Optical Memory Systems*, Jordan Isailovic', 1985, Prentice Hall, Inc., Chapter 7, "Optical Memories", pp. 293-322.

*Primary Examiner*—Roy N. Envall, Jr.
*Assistant Examiner*—Muhammad N. Edun
*Attorney, Agent, or Firm*—Brown, Martin, Haller & McClain

[57] ABSTRACT

An array of diode lasers selected to emit at certain fixed wavelengths is assembled to temperature stabilzed Bragg reflectors to assure maintenance of the selected wavelength within 1 Å. One laser is included in the array for each wavelength at which absorption will occur within a photochemically active optical storage medium. Each temperature stabilized laser is focussed by a lens onto an optical storage medium containing photoactive chemical components containing guest and hose molecules, as is known in the art. Light emitted by each laser will be used to burn a pit for each bit of data at the locations of the storage medium. One or more photodetectors located on the opposite side of the sotrage medium to detect the presence or absence of a hole with respect to the selected wavelength with which the hole was initially burned. A similar device is available with a temperature stabilized tunable laser which accurately controls the selected wavelength withing 1 Å.

13 Claims, 1 Drawing Sheet

OPTICAL DATA STORAGE USING TEMPERATURE STABILIZER LASERS

BACKGROUND OF THE INVENTION

I. Field of the Invention

The present invention relates to methods of optical data storage and more specifically to optical storage by photochemical hole burning.

II. Description of Related Art

Optical data storage systems have become highly popular for computer mass storage. These systems offer high storage density with high data rates, rapid random access to data, potential archival properties and relatively low media cost.

The best known optical data storage systems are those which follow the video disk technology of transferring information onto a mechanical configuration of pits stamped into a metal disk. The first type of system involves read only memory (ROM).

A second type of optical memory uses a programmable disk scheme which is "write once/read many times". This system permits the user to preserve files by burning pits into the disk with a laser which can later be used, at a lower power, to detect the pit. Some of these systems provide erasability, but erasable disks have the disadvantages of low signal to noise ratio and degradation of the recording quality after consecutive reads on the same location, causing an increase in the bit error rate.

Typically, optical data storage systems use lasers of the same wavelength for reading and writing, (e.g., semiconductor diode lasers at 830 nm, He-Ne lasers at 633 nm, argon lasers are 488 nm and He-Cd lasers at 422 nm). The power of the read beam is reduced so as not to degrade the recording medium. Because every pit in the disk can be detected by the laser used, adequate spacing must be permitted between the pits to avoid overlap of signals picked up by the reader. Thus, the density of data is limited based on considerations of beam width and tracking accuracy.

A method of significantly improving the data packing density is to use different wavelengths of light to activate a photochemically active medium which is sensitive to discrete wavelengths. This photochemically-active medium is usually set in a glass or polymer matrix. The phenomenon of "photochemical hole burning" involves excitation of a fraction of the molecules of photoactive material, usually in the form of a crystal, so that the excited modules no longer contribute to absorption of the laser wavelength, resulting in a hole or dip in the absorption line when the location is illuminated by light of the same wavelength. This excitation is induced by exposure of the photo-active material to narrowband optical radiation tuned to a frequency within the inhomogeneously-broadened zero-photon line of the material the mechanism responsible for the hole burning is thought to be ionization caused by electron tunneling from photoexcited centers to nearby traps.

Approximately 1,000 discrete, resolvable holes can be burned at each spacial location, with a theoretical possibility of $10^{11}$ bits/cm$^2$.

Clearly, one limitation on achieving the theoretical goal for photochemical hole burning is the ability to control a laser sufficiently t repeatably select discrete wavelengths of light.

Researchers in the field have proposed the use of tunable dye lasers which are capable of tight control, but are complex and bulky, contributing to packaging problems, and are expensive. Other researchers have used diode lasers which have been tuned by periodically ramping the injection current of the laser to scan repetitively over the spectral region. This scanning method is somewhat haphazard, lacking control and repeatability and, as is well known, diode lasers are subject to shifts in output wavelength as a function of temperature. Typically, this technique allows addressing of only about 100 separate frequency channels.

It would be desirable to have a laser for optical data storage systems using photochemical hole burning which avoids the size, packaging and expense problems of tunable dye lasers, yet is more controllable and less temperature sensitive than tunable diode lasers, thereby permitting a greater number of frequency channels within the active range of the photoactive medium. It is to this objective that the present invention is directed.

SUMMARY OF THE INVENTION

Two commonly-owned patents of the present inventor disclose configurations of diode lasers which are ideally suited for use in optical data storage systems using photochemical hole burning. The first of these patents, U.S. Pat. No. 5,043,991, issued Aug. 27, 1991 discloses a device for temperature stabilization of diode lasers which permits tight control of emission wavelength within 1 Å of the chosen wavelength. The second patent, U.S. Pat. No. 4,993,032 issued Feb. 12, 1991 discloses a feedback tuning circuit which permits tight control of emission wavelength of tunable diode lasers. It is an advantage of the present invention to utilize tightly controlled, temperature stabilized diode lasers to provide a means to activate a photoactive material with discrete wavelengths.

In a first embodiment, an array of diode lasers selected to emit at certain fixed wavelengths is assembled with temperature stabilized Bragg reflectors for each laser to assure maintenance of each selected wavelength within 1 Å. One temperature stabilized laser, consisting of the combined diode laser and Bragg reflector, is included in the array for each wavelength at which absorption will occur within the photochemically active optical storage medium. Each temperature stabilized laser is collimated by a lens to focus on the optical storage medium with photoactive chemical components containing guest and host molecules, as is known in the art. Light emitted by each laser will be used to burn a "pit" or "hole" for each bit of data at the locations of the storage medium. A lens and a photodetector are located on the opposite side of the storage medium to detect the presence or absence of a hole with respect to the selected wavelength with which the hole was initially burned.

In a second embodiment, a tunable diode laser is assembled to a tuning circuit which is temperature stabilized to provide accurate and tightly controlled feedback to maintain the tuned wavelength of the laser to within 1 Å. The laser can be tuned to scan through a series of desired wavelengths or can select a given wavelength. The laser light is collimated by a lens and focused onto an optical storage medium. The detector assembly is located on the opposite side of the storage medium.

BRIEF DESCRIPTION OF THE DRAWINGS

Understanding of the present invention will be facilitated by consideration of the following detailed description of the preferred embodiments of the present invention, taken in conjunction with the accompanying drawings, in which like reference numerals refer to like parts and in which.

DETAILED DESCRIPTION OF THE PREFERRED EMBODIMENTS

Figure 1:
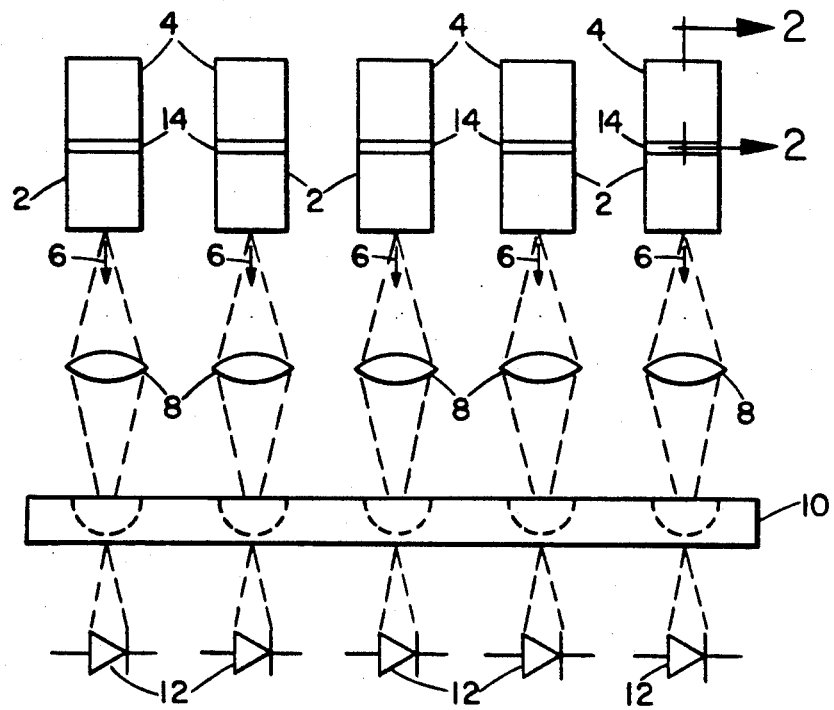
FIG. 1 is a diagrammatic view of a first embodiment of the present invention.

The first embodiment of the present invention is shown in FIG. 1. Lasers 2 are fixed wavelength diode lasers which are assembled with temperature stabilized Bragg reflectors 4. A lens 8 is placed in the output path 6 of each laser 2 in order to focus the light onto the photochemical storage medium the lasers 2 to detect light transmitted through the storage medium 10. The recording (writing) operation forms photochemical holes 13 and 13' in the storage medium 10.

Laser 2 is a commercially available semiconductor diode laser which is butt-coupled or otherwise assembled with Bragg reflector 4. Alternately, the laser may be a custom monolithic distributed Bragg reflector laser with a temperature stable grating. The assembly may be accomplished by affixing both components onto a substrate of low thermal expansion glass such as Corning ULE or Schott Zerodur. An anti-reflective coating is preferably deposited at the interface 14 between laser 2 and Bragg reflector 4. Bragg reflector 4 is made to be temperature stable against refractive index changes by a process disclosed in the cited cc-pending applications and to be briefly described below.

Each laser 2 is selected for its ability to emit light at a desired wavelength. The corresponding Bragg reflector 4 is formed with the appropriate grating spacing $\Delta$ to satisfy the equation $\lambda_{Peak} = 2\Delta n_{eff}$ for the wavelength desired for lasing. Lens 8 may be arranged so that one lens is provided to correspond to each laser. Alternately, a single lens 8 may be provided for the entire array of lasers, so that either a single or multiple lens arrangement focuses the light onto the storage medium 10.

Currently available optical storage media consist of a combination of guest molecules and host molecules, the guest molecules being quinone derivatives such as 1,4 - dihydroxy anthraquinone (DAQ) and 4 - amino - 2,6 - bis (4 - butyl phenoxy) - 1,5 - dihydroxy anthraquinone (ABDAQ) and the host molecules being polymers such as PMMA and poly - 2 -hydroxyethyl methacrylate (PHEMA). Efficient formation of spectral holes has been found within the wavelength range of 565 to 585 nm for a DAQ/PHEMA system and 580 to 608 nm for an ABDAQ/PHEMA system. Therefore, the array of lasers 2 should be selected to emit light within these bands. Where other materials are used for the storage medium the desired band of wavelengths will be adjusted accordingly.

Figure 3:
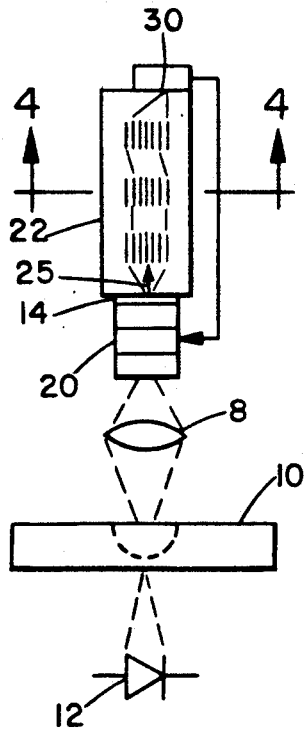
FIG. 3 is a diagrammatic view of a second embodiment of the present invention.

The second embodiment of the present invention is shown in FIG. 3. Laser 20 is a tunable diode laser which has voltage controlled tuning capability. Back facet emission is directed as light path 25 toward the optical tuning circuit 22 which is temperature stabilized by the same process as used for the Bragg reflector 4 of the first embodiment.

Optical tuning circuit 22 consists of a series of gratings which deflect the light path 25 according to the wavelength of the light. A detector array 30 receives the deflected light at a specific location depending on the light's wavelength and converts the location of activation into a signal which induces a phase shift in the laser 20 so that the output wavelength is controlled within a tight tolerance. In this embodiment, the laser 20 can be provided with an additional input which causes it to scan through the desired range of wavelengths for optical data storage or the optical tuning circuit 22 can be tied into a microprocessor which will cause the laser to step through a sequence of desired wavelengths with the tuning circuit 22 providing input as to the last wavelength scanned and how much of a tuning step is required to attain the next desired wavelength.

Figure 2:
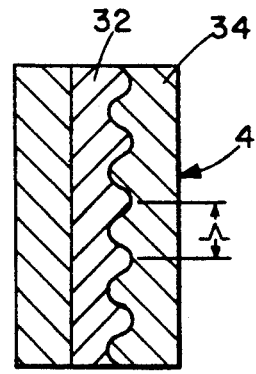
FIG. 2 is a cross-sectional view taken on line 2—2 of FIG. 1.
Figure 4:
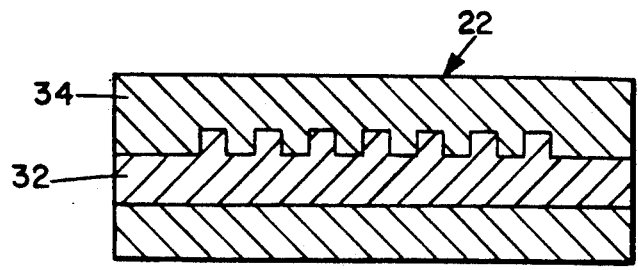
FIG. 4 is a cross-sectional view taken on line 4—4 of FIG. 3.

Both the Bragg reflector 4 and the optical tuning circuit 22 are temperature stabilized to assure wavelength control within 1 Å. Each of the temperature stabilized components is a waveguide consisting of dielectric layers of different refractive indices, as shown in FIGS. 2 and 4. The first layer 32 is $SiO_2$, which has an index-temperature coefficient of approximately $1.0 \times 10^{-5}/°C$. At the locations where gratings are formed, ridges are defined photolithographically or by electron lithographic techniques into the upper surface of layer 32.

The second dielectric layer 34 comprises a material which has an index-temperature coefficient which is approximately equal in magnitude but opposite to the index-temperature coefficient of $SiO_2$, i.e., the refractive index decreases with temperature. The suggested material for layer 34 is $Ta_2O_5$. Since the waveguiding and, thus, the wavelength stabilization is dependent upon the refractive index of the two layers within the waveguide, the different dielectric materials maintain the refractive index at a constant level by cancelling the changes in refractive index in one layer with the changes in refractive index of the other layer.

The temperature stabilized output of laser 2 or laser 20 is directed toward lens 8 which focusses the beam onto the optical storage medium 10, which may be in the form of a crystal as well as a disk, on any other configuration in which the photochemically active guest and host molecules may be formed.

On the opposite side of the optical storage medium 10 is one detector 12 for each laser, capable of detecting within the appropriate range of wavelengths. The signal generated by detector 12 is amplified and then transmitted to a signal analyzer and manipulated, displayed or stored.

The narrow, tightly controlled wavelength attainable with the use of temperature stabilized lasers permits use of many wavelengths within a narrow band without concern for leaving a wide enough spacing between each wavelength to avoid overlapping of two adjacent wavelength deviation ranges.

Writing of data which consists of bits of information is done by burning a hole 13 at a given location with a particular wavelength so that the photochemically active material can no longer absorb light at that wavelength. Therefore, by writing a bit at, for example, 600 nm within a laser emitting that wavelength, the optical storage medium 10 will not absorb when it is scanned by a reading laser with the same wavelength but at a lower power than the writing laser, to avoid damaging the hole 13. Instead, light at 600 nm will be transmitted through the hole 13 optical storage medium 10 to impinge upon detector 12, indicating a 1 or 0 at that data location, depending on whether a hole is a 1 or a 0. At the same location on the optical storage medium 10, a bit of data could have been written at 605 nm, a reading laser emitting at 600 nm, either the individual laser 2 of the array or the tunable laser tuned to that wavelength, will not be transmitted through the 605 nm hole, so no detection occurs for that bit at 600 nm. When a different laser 2, selected to emit at 605 nm, or laser 20 tuned to 605 nm, is scanned across the spot, the light is transmitted through the medium 10 to be detected by detector 12 as shown in FIG. 1.

Because of the tightly controlled wavelength emitted by the temperature stabilized lasers, it would be possible to write and read a hole at wavelength intervals of 1 Å or smaller at each spatial location, depending upon the properties of the optical storage medium.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A device for high density information storage comprising:
    an array of temperature stabilized lasers for emitting light across a range of wavelengths, each laser of said array being adapted to emit light at a wavelength within said range, said wavelength being different from all other wavelengths within said range and being temperature stabilized by at least one dielectric grating comprising layers having approximately equal and opposite index-temperature coefficients;
    a lens in an emission path of each said laser, said lens having a focal point;
    a storage medium disposed in said emission path at said focal point, said storage medium being light absorptive at a plurality of wavelengths and having a range of absorptivity which includes said range of wavelengths so that focusing light of at least one selected wavelength burns a spectral hole corresponding to said at least one selected wavelength in said storage medium at a selected location and focusing light of two or more selected wavelengths burns a corresponding number of superimposed spectral holes;
    an array of reading lasers, one reading laser corresponding to each said laser, said reading laser being scanned onto said storage medium at said at least one selected wavelength to cause transmission of light through said spectral hole corresponding to said at least one selected wavelength; and
    a detector for detecting light transmitted through said spectral hole.

2. A device as in claim 1 wherein said array of reading lasers is said array of temperature stabilized lasers.

3. A device as in claim 1 wherein said array of reading lasers is operated at a reduced power relative to a power used for burning said spectral hole.

4. A device for high density information storage comprising:
    a tunable temperature stabilized laser for emitting light across a range of wavelengths, temperature stabilization being achieved by dielectric gratings comprising layers having approximately equal and opposite index-temperature coefficients;
    a lens in an emission path of said laser, said lens having a focal point;
    a temperature medium disposed in said emission path at said focal point, said storage medium being light absorptive at a plurality of wavelengths and having a range of absorptivity which includes said range of wavelengths so that focusing light at a selected wavelength burns a spectral hole corresponding to said selected wavelength in said storage medium at a selected location and focusing light of two or more selected wavelengths burns a corresponding number of superimposed spectral holes;
    a tunable reading laser tunable to said range of wavelengths, said reading laser being scanned onto said storage medium at said selected wavelength to cause transmission of light through said spectral hole corresponding to said selected wavelength; and
    a detector for detecting light transmitted through said spectral hole.

5. A device as in claim 4 wherein said tunable reading laser is said tunable temperature stabilized laser.

6. A device as in claim 4 wherein said tunable reading laser is operated at a reduced power relative to a power used for burning said spectral hole.

7. A method of high density information storage on an optical storage medium which comprises:
    forming an array of temperature stabilized diode lasers which emits light across a range of wavelengths, each laser of said array being adapted to emit light at a wavelength which is different from wavelengths emitted by other lasers in said array and being temperature stabilized by dielectric gratings comprising layers having approximately equal and opposite index-temperature coefficients;
    focusing light emitted from each said laser at a first power onto a storage medium, said storage medium being light absorptive at a plurality of wavelengths and having a range of absorptivity which includes said range of wavelengths;
    burning at least one spectral hole in said storage medium corresponding to each wavelength within said range of wavelengths, said spectral hole being capable of being read only when scanned by a reading laser having the same wavelength with which said spectral hole was burned.

8. A method as in claim 7 further comprising reading said spectral hole by scanning said storage medium with said reading laser having the same wavelength with which said spectral hole was burned and detecting transmission of light from said reading laser through said spectral hole.

9. A method as in claim 8 wherein said reading laser is said laser.

10. A method as in claim 8 wherein the step of reading includes scanning with said laser at a reduced power which is low than said first power.

11. A method of high density information storage on an optical storage medium which comprises:
    forming a tunable temperature stabilized diode laser which emits light within a range of wavelengths using a dielectric grating having layers with approximately equal and opposite index-temperature coefficients;

focusing light emitted from said laser onto storage medium, said storage medium being light absorptive at a plurality of wavelengths and having a range of absorptivity which includes said range of wavelengths; and burning at least one spectral hole in said storage medium corresponding to a discrete wavelength within said range of wavelengths, said spectral hole being capable of being read only when scanned by a reading light having the same wavelength with which said spectral hole was burned.

12. A method as in claim 11 further comprising reading said spectral hole by scanning said storage medium with said reading light having the same wavelength with which said spectral hole was burned and detecting transmission of said reading light through said spectral hole.

13. A method as in claim 8 wherein the step of reading said spectral hole comprises adjusting said laser to emit said reading light at a reduced power which is lower than a power emitted during the step of burning.

* * * * *

UNITED STATES PATENT AND TRADEMARK OFFICE
CERTIFICATE OF CORRECTION

PATENT NO. : 5,136,572
DATED : August 4, 1992
INVENTOR(S) : Eric M. Bradley

It is certified that error appears in the above-identified patent and that said Letters Patent is hereby corrected as shown below:

On the title page, item [54] and in column 1, line 3, in the title delete "Stabilizer" insert --Stabilized--.

Column 6, line 10, delete "temperature" insert --storage--.

Column 8, line 9, delete "8" insert --12--.

Signed and Sealed this

Ninth Day of November, 1993

Attest:

BRUCE LEHMAN

Attesting Officer — Commissioner of Patents and Trademarks